(12) United States Patent
Kondo (10) Patent No.: US 11,956,405 B2
(45) Date of Patent: Apr. 9, 2024

(54) INFORMATION PROCESSING APPARATUS, IMAGE FORMING SYSTEM, METHOD OF CONTROLLING TOTAL-AMOUNT RESTRICTION, AND NON-TRANSITORY RECORDING MEDIUM

(71) Applicant: Paru Kondo, Kanagawa (JP)

(72) Inventor: Paru Kondo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/963,006

(22) Filed: Oct. 10, 2022

(65) Prior Publication Data

US 2023/0130174 A1  Apr. 27, 2023

(30) Foreign Application Priority Data

Oct. 26, 2021 (JP) .................................. 2021-174818

(51) Int. Cl.
*H04N 1/60* (2006.01)
*G06T 7/90* (2017.01)

(52) U.S. Cl.
CPC ............. *H04N 1/6027* (2013.01); *G06T 7/90* (2017.01); *H04N 1/6019* (2013.01); *H04N 1/605* (2013.01); *G06T 2207/10024* (2013.01)

(58) Field of Classification Search
CPC ..... H04N 1/6027; H04N 1/6019; H04N 1/605
See application file for complete search history.

(56) References Cited

U.S. PATENT DOCUMENTS

| | | | | |
|---|---|---|---|---|
| 9,030,711 | B2* | 5/2015 | Yoshida | H04N 1/60 358/1.9 |
| 9,146,513 | B2* | 9/2015 | Eguchi | G03G 15/50 |
| 11,182,112 | B1* | 11/2021 | Chang | H04N 1/6033 |
| 11,477,347 | B2* | 10/2022 | Morales | H04N 1/605 |
| 2003/0156120 | A1* | 8/2003 | Sasanuma | H04N 1/6027 345/600 |
| 2004/0004644 | A1* | 1/2004 | Komatsu | B41J 2/2128 347/15 |
| 2007/0292156 | A1* | 12/2007 | Eguchi | G03G 15/50 399/45 |

(Continued)

FOREIGN PATENT DOCUMENTS

| | | | | |
|---|---|---|---|---|
| JP | 2004-009480 | | 1/2004 | |
| JP | 2004248053 | A * | 9/2004 | ........... H04N 1/4078 |

(Continued)

*Primary Examiner* — Ted W Barnes
(74) *Attorney, Agent, or Firm* — Harness, Dickey & Pierce, P.L.C.

(57) ABSTRACT

An information processing apparatus includes: circuitry that converts: a total-amount restriction value that is input into a value corresponding to a gradation value; for each of colors of color materials included in an image forming apparatus, convert a gradation value of color information into a value of a color material amount normalized using a gradation value of the color of the color information; perform total-amount restriction on the normalized and converted value of the color material amount of the each of the colors based on the converted value corresponding to the gradation value; and convert the value of the color material amount of the each of the colors after the total-amount restriction into the gradation value of the each of the colors.

11 Claims, 8 Drawing Sheets

(56) References Cited

U.S. PATENT DOCUMENTS

| | | | | |
|---|---|---|---|---|
| 2009/0116046 A1* | 5/2009 | Nakashio | ............. | H04N 1/6025 |
| | | | | 358/1.9 |
| 2011/0141500 A1* | 6/2011 | Togami | .................... | H04N 1/56 |
| | | | | 358/1.9 |
| 2011/0216381 A1* | 9/2011 | Soeda | ................ | H04N 1/6025 |
| | | | | 358/518 |
| 2012/0020694 A1* | 1/2012 | Shirata | ............... | G03G 15/5016 |
| | | | | 399/81 |
| 2012/0086987 A1* | 4/2012 | Tamura | ................ | G03G 15/011 |
| | | | | 358/3.24 |
| 2012/0147393 A1* | 6/2012 | Matsuzaki | ........... | H04N 1/6025 |
| | | | | 358/1.9 |
| 2012/0147394 A1* | 6/2012 | Matsuzaki | ......... | G03G 15/0121 |
| | | | | 358/1.9 |
| 2013/0038908 A1* | 2/2013 | Nagai | .................... | H04N 1/605 |
| | | | | 358/1.9 |
| 2015/0138574 A1* | 5/2015 | Yamaguchi | .......... | H04N 1/6022 |
| | | | | 358/1.9 |
| 2016/0057314 A1* | 2/2016 | Morovic | ................ | H04N 1/605 |
| | | | | 358/3.23 |
| 2020/0372311 A1* | 11/2020 | Luttmer | ............. | G06K 15/1878 |
| 2022/0116514 A1* | 4/2022 | Hagihara | ................ | H04N 1/603 |
| 2023/0059777 A1* | 2/2023 | Lee | ......................... | H04N 1/23 |

FOREIGN PATENT DOCUMENTS

| | | | | | |
|---|---|---|---|---|---|
| JP | 2008167161 A | * | 7/2008 | ........... | H04N 1/6022 |
| JP | 2011-062843 | | 3/2011 | | |
| JP | 2011062843 A | * | 3/2011 | ............... | H04N 1/52 |
| JP | 2011069864 A | * | 4/2011 | ........... | G06F 3/1219 |
| JP | 2019062287 A | * | 4/2019 | ........... | H04N 1/4057 |
| KR | 20120023567 A | * | 3/2012 | ................ | G06F 3/12 |

\* cited by examiner

| GRADATION VALUE | C COLOR MATERIAL AMOUNT | M COLOR MATERIAL AMOUNT | Y COLOR MATERIAL AMOUNT | K COLOR MATERIAL AMOUNT |
|---|---|---|---|---|
| 0 | 0 | 0 | 0 | 0 |
| 1 | 0 | 1 | 1 | 1 |
| 2 | 1 | 1 | 2 | 1 |
| ⋮ | ⋮ | ⋮ | ⋮ | ⋮ |
| 150 | 134 | 140 | 139 | 135 |
| 151 | 134 | 141 | 139 | 136 |
| 152 | 135 | 142 | 140 | 136 |
| ⋮ | ⋮ | ⋮ | ⋮ | ⋮ |
| 254 | 243 | 250 | 249 | 247 |
| 255 | 248 | 255 | 253 | 250 |

INFORMATION PROCESSING APPARATUS, IMAGE FORMING SYSTEM, METHOD OF CONTROLLING TOTAL-AMOUNT RESTRICTION, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-174818, filed on Oct. 26, 2021, in the Japan Patent Office, the entire disclosure of which is hereby incorporated by reference herein.

BACKGROUND

Technical Field

The present disclosure relates to an information processing apparatus, an image forming system, a method of controlling total-amount restriction, and a non-transitory recording medium.

Related Art

In an image forming apparatus such as a color copier of related art, when the total amount of color materials is too large, a transfer failure or a fixing failure may occur, and when the total amount of color materials is too small, color reproducibility with high saturation may decrease and an original image quality is not obtained in some cases. Thus, there is a total-amount restriction technique of reducing the total amount of color materials when an image is formed.

For example, a total-amount restriction technique of related art restricts the amount of ink of each color used for printing in accordance with the total amount of ink designated by a user.

However, a processor that performs the total-amount restriction converts a numerical value given with a gradation value of such as 256 into a value indicating the amount of color material for color data of, for example, each color of cyan, magenta, yellow, and black (CMYK) serving as color materials included in an image forming apparatus, and then performs the total-amount restriction. Since the processing includes the processing of converting the gradation value into the amount of color material, the processing is complicated, and the technique of the total-amount restriction is not easily applied.

SUMMARY

According to an embodiment of the present disclosure, an information processing apparatus includes circuitry that converts an input total-amount restriction value into a value corresponding to a gradation value; for each of colors of color materials included in an image forming apparatus, converts a gradation value of color information into a value of a color material amount normalized using a gradation value of the color of the color information; performs total-amount restriction on the normalized and converted value of the color material amount of the each of the colors based on the converted value; and converts the value of the color material amount of the each of the colors after the total-amount restriction into the gradation value of the each of the colors.

According to another embodiment of the present disclosure, an image forming system includes the information processing apparatus; and the image forming apparatus that forms an image based on color information after the total-amount restriction in the information processing apparatus. The image forming system may be implemented by a single apparatus or a plurality of apparatuses.

According to still another embodiment of the present disclosure, a total-amount restriction method of performing total-amount restriction of color materials includes converting an input total-amount restriction value into a value corresponding to a gradation value; for each of colors of color materials included in an image forming apparatus, converting a gradation value of color information into a value of a color material amount normalized using a gradation value of the color of the color information; performing total-amount restriction on the normalized and converted value of the color material amount of the each of the colors based on the converted value corresponding to the gradation value; and converting the value of the color material amount of the each of the colors after the total-amount restriction into the gradation value of the each of the colors.

According to yet another embodiment of the present disclosure, a non-transitory recording medium, when executed by one or more processors, causes the processors to perform a total-amount restriction method of performing total-amount restriction of color materials. The total-amount restriction method includes converting an input total-amount restriction value into a value corresponding to a gradation value; for each of colors of color materials included in an image forming apparatus, converting a gradation value of color information into a value of a color material amount normalized using a gradation value of the color of the color information; performing total-amount restriction on the normalized and converted value of the color material amount of the each of the colors based on the converted value corresponding to the gradation value; and converting the value of the color material amount of the each of the colors after the total-amount restriction into the gradation value of the each of the colors.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an information processing apparatus, an image forming apparatus, a total-amount restriction method, and a program stored in a non-transitory recording medium will be described in detail with reference to the accompanying drawings.

First Embodiment

Figure 1:
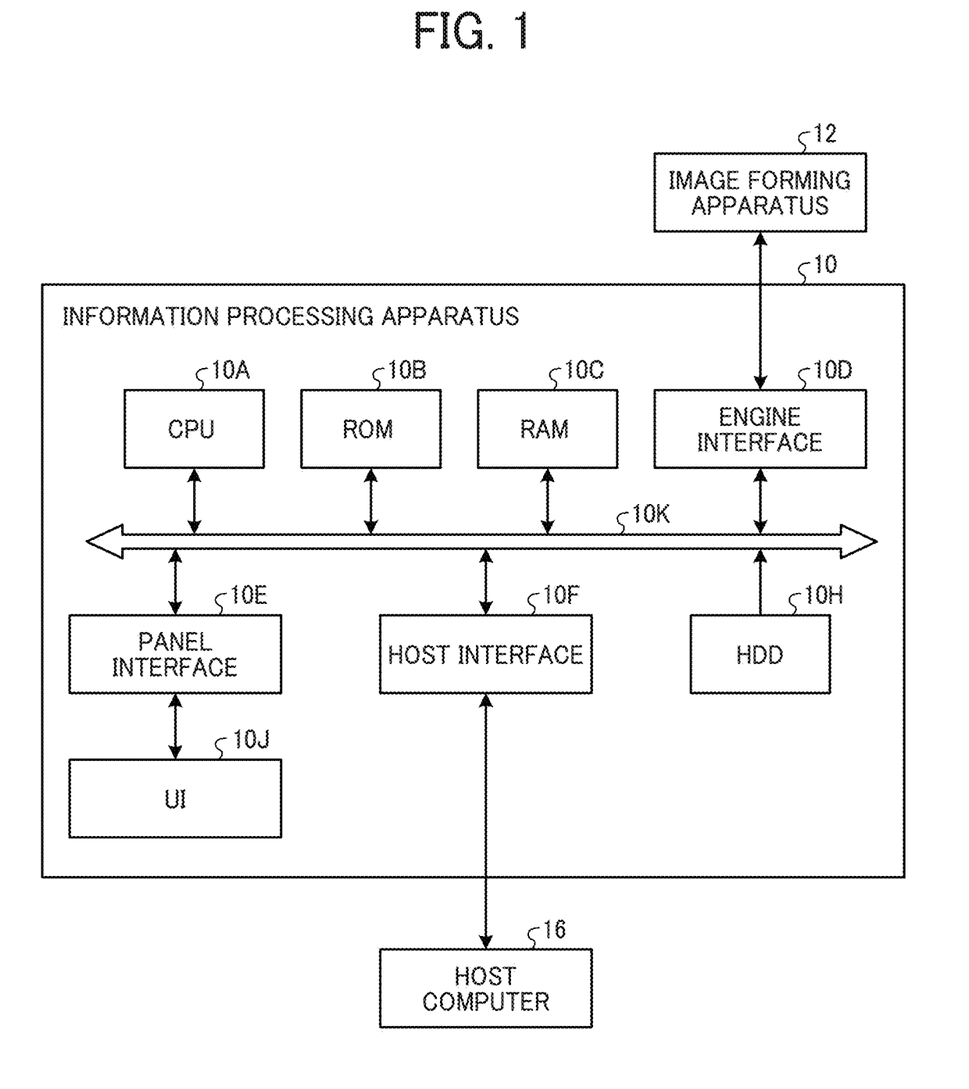
FIG. 1 is a diagram illustrating an example of a configuration of an image forming system including an information processing apparatus according to a first embodiment.

FIG. 1 is a diagram illustrating an example of a configuration of an image forming system including an information processing apparatus according to a first embodiment. FIG. 1 illustrates an image forming system including a host computer 16, an information processing apparatus 10, and an image forming apparatus 12. In the example illustrated in FIG. 1, the host computer 16 and the image forming apparatus 12 are communicatively connected to the information processing apparatus 10.

The host computer 16, the information processing apparatus 10, and the image forming apparatus 12 may be applied to apparatuses configured to be connectable to a network. For example, the host computer 16 is applied to a personal computer (PC) of a user, the information processing apparatus 10 is applied to a print server, and the image forming apparatus 12 is provided as a network printer. In this case, the apparatuses communicate with one another via the network.

The number of image forming apparatuses 12 communicably connected to the information processing apparatus 10 is not limited to one. A plurality of image forming apparatuses 12 may be communicably connected to the information processing apparatus 10. In one example, the configuration may be modified such that the image forming apparatus 12 is directly connected to the host computer 16.

The host computer 16 is connected to the information processing apparatus 10 illustrated in FIG. 1. The host computer 16 is, for example, a PC. The information processing apparatus 10 receives a drawing command of data for printing from the host computer 16, converts the drawing command into data in a format processable by the image forming apparatus 12, and outputs the processed print data to the image forming apparatus 12.

The information processing apparatus 10 includes a central processing unit (CPU) 10A, a read-only memory (ROM) 10B, a random access memory (RAM) 10C, an engine interface 10D, a panel interface 10E, a host interface 10F, and a hard disk drive (HDD) 10H. The CPU 10A, the ROM 10B, the RAM 10C, the engine interface 10D, the panel interface 10E, the host interface 10F, and the HDD 10H are connected to one another via a bus 10K.

The CPU 10A executes a control program stored in a memory to control the entire information processing apparatus 10.

The ROM 10B, the RAM 10C, and the HDD 10H are examples of the memory. The ROM 10B stores a fixed program. The RAM 10C has a storage region serving as a work area of the CPU 10A. The HDD 10H stores, for example, various control programs and a conversion table.

The panel interface 10E is an interface for coupling with a user interface (UI) 10J. The panel interface 10E displays a screen instructed by the CPU 10A on the UI 10J, and transmits an operation command received by the UI 10J to the CPU 10A.

The UI 10J includes a display for a setting screen to make various settings of the image forming apparatus 12, and an input receiving section to receive inputs of various settings from the user. For example, a display device such as a liquid crystal display device or an organic electroluminescence (EL) display device is provided as the display. A touch input panel is provided on a screen of the display device as the input receiving section. The input receiving section is not limited to the touch input panel, and may receive an input by an operation with a keyboard or a mouse.

The host interface 10F is an interface for coupling with the host computer 16. The host interface 10F is communicatively connected to the host computer 16 and receives a drawing command from the host computer 16. The host computer 16 may be connected in a wired or wireless manner.

The engine interface 10D is an interface for coupling with the image forming apparatus 12. The engine interface 10D outputs print data with the conversion processing performed to the image forming apparatus 12 in response to an output instruction from the CPU 10A.

The image forming apparatus 12 includes a printer. The image forming apparatus 12 includes, for example, an electrophotographic image forming apparatus or an inkjet image forming apparatus. The image forming apparatus 12 forms an image on a medium using a printer with print data generated by the information processing apparatus 10.

In the present embodiment, a configuration in a case where the image forming apparatus 12 is an electrophotographic image forming apparatus is described as an example. For example, the image forming apparatus 12 forms an image with toner of four colors of CMYK.

In a case of an inkjet image forming apparatus, an image is formed with ink of four colors of CMYK.

Color materials, such as toner or ink, include all kinds of color materials that adhere and fix to a medium and color materials that adhere and permeate to a medium. The medium refers to a medium to be recorded, such as paper, recording paper, a recording sheet, a film, or cloth, and includes any medium to which a color material adheres unless otherwise particularly limited.

The material of the medium may be any material, such as paper, yarn, fiber, cloth, leather, metal, plastic, glass, wood, or ceramic, to which a color material can adhere even temporarily.

Figure 2:
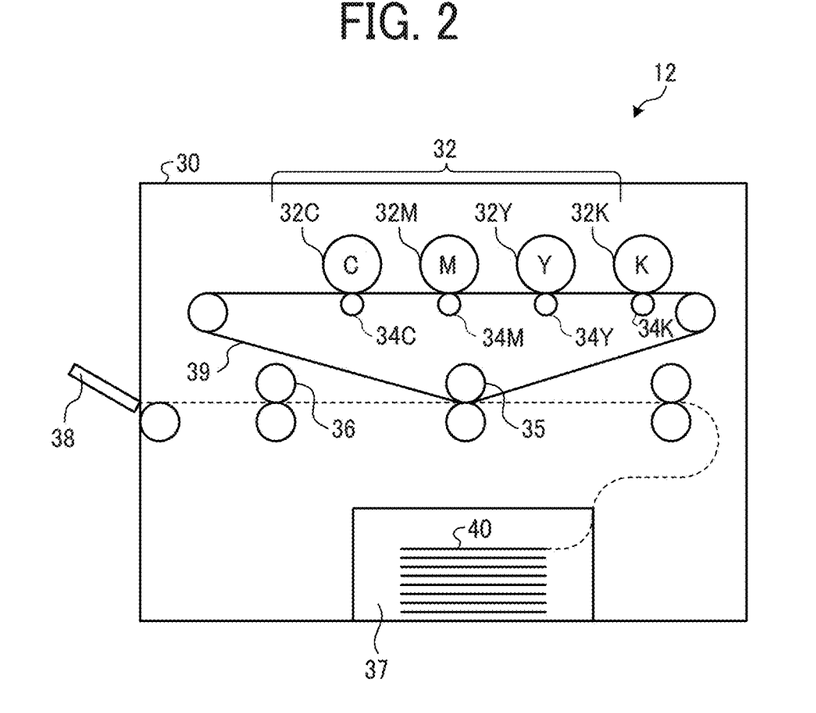
FIG. 2 is a diagram illustrating an example of a configuration of an image forming apparatus.

FIG. 2 illustrates an example of a configuration of the image forming apparatus 12. A main body 30 includes image forming units 32C, 32M, 32Y, and 32K as an image forming unit 32. Each of the image forming units 32C, 32M, 32Y, and 32K includes an image forming portion that forms a toner image of a corresponding one of CMYK. Each toner image formed by the corresponding image forming portion is transferred onto an intermediate transfer belt 39 at a corresponding one of first transfer units 34C, 34M, 34Y, and 34K.

A medium 40 on a sheet feeding tray 37 is conveyed to a second transfer unit 35. The second transfer unit 35 transfers the toner image transferred on the intermediate transfer belt 39 onto the medium 40. A fixing unit 36 fixes the image to the medium 40. Then, the medium 40 is discharged onto a discharge tray 38.

Figure 3:
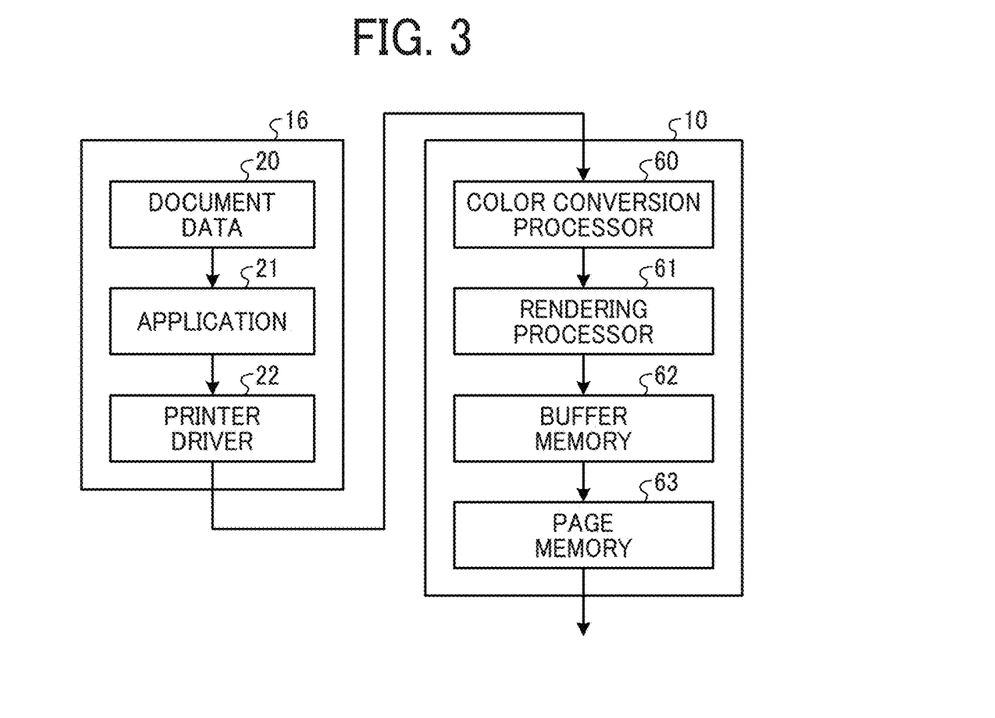
FIG. 3 is a diagram illustrating an overview of example processing performed by a host computer and the information processing apparatus.

FIG. 3 is a diagram illustrating an overview of processing performed by the host computer 16 and the information processing apparatus 10. The host computer 16 includes, for example, various applications 21 that generate document data 20. When the host computer 16 receives execution of print processing of the document data 20 generated by the application 21 from the user, a printer driver 22 performs processing to output a drawing command.

The information processing apparatus 10 includes a color conversion processor 60, a rendering processor 61, a buffer memory 62, and a page memory 63, and converts the drawing command received from the host computer 16 into print data processable by the image forming apparatus 12.

For example, the color conversion processor 60 performs color conversion processing on color information in an RGB format of the drawing command received from the host computer 16 into color information (for example, CMYK) suitable for the image forming apparatus 12. In this case, the "color information" is a color signal or color data. In the following description, processing by software is described as an example and terminology is unified for color data.

The rendering processor 61 converts data in a command format into image data in a raster format, and stores the image data in the buffer memory 62. The page memory 63 outputs the image data in the raster format stored in the buffer memory 62 as print data.

Figure 4:
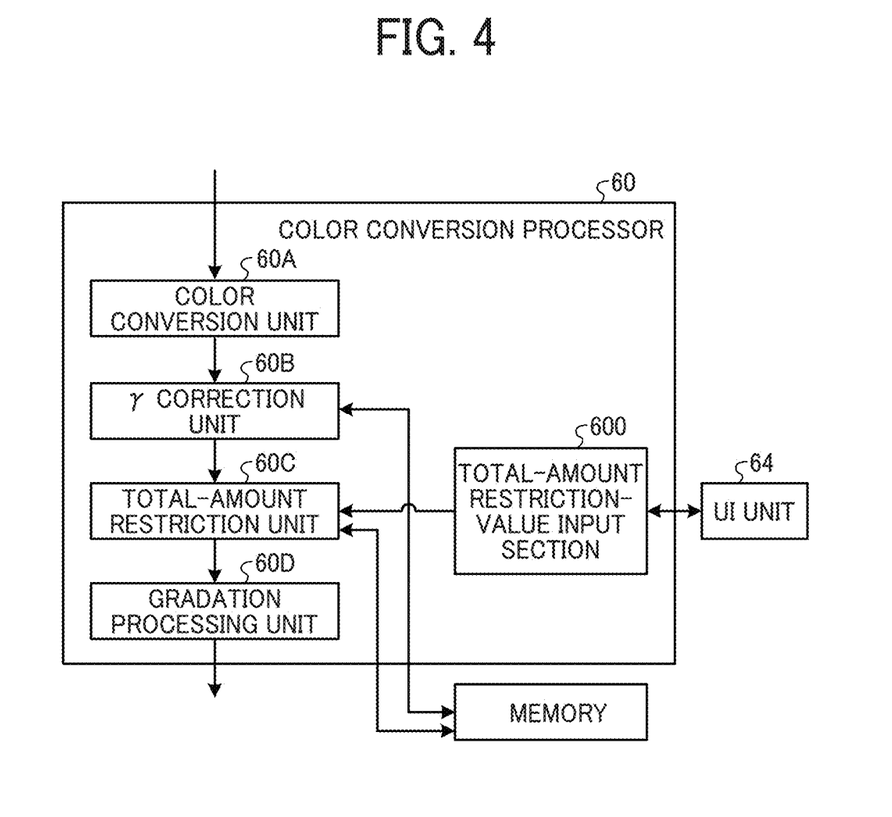
FIG. 4 is a diagram illustrating an example of a configuration of a color conversion processor.

A configuration of the color conversion processor 60 is described next. FIG. 4 is a diagram illustrating an example of the configuration of the color conversion processor 60. For example, functional units corresponding to the color conversion processor 60 are implemented in the CPU 10A by the CPU 10A executing various control programs and function as follows.

The color conversion processor 60 includes a color conversion unit 60A, a γ correction unit 60B, a total-amount restriction unit 60C, a gradation processing unit 60D, and a total-amount restriction-value input section 600.

The memory stores, for example, a γ correction table, and a conversion table for total-amount restriction.

The color conversion unit 60A performs color conversion processing based on the drawing command received from the host computer 16. For example, the color conversion unit 60A converts color data in a color space of RGB into color data in a color space of CMY (C color data, M color data, and Y color data), and further converts the color data into color data of CMYK by black (ink) processing. Accordingly, the color conversion unit 60A obtains color data of each of CMYK (C color data, M color data, Y color data, and K color data). Then, the color conversion unit 60A outputs the converted CMYK color data to the γ correction unit 60B.

The γ correction unit 60B performs gamma (γ) correction on the color data of each of 5 CMYK (C color data, M color data, Y color data, and K color data). In the present embodiment, the γ correction unit 60B performs the γ correction on the data value of each color using a correction table in the memory. The correction table is set in accordance with the characteristics of an image processing engine.

The total-amount restriction unit 60C performs total-amount restriction processing using the color data of each of CMYK (C color data, M color data, Y color data, and K color data) after the γ correction. The total-amount restriction unit 60C corrects the color data of each of CMYK (C color data, M color data, Y color data, and K color data) so that the total amount of the color material on the medium 40 becomes a restriction value or less.

After the total-amount restriction, the gradation processing unit 60D executes gradation processing in accordance with the format of the image forming apparatus 12, and outputs print data to the image forming apparatus 12.

The details of the processing of the total-amount restriction unit 60C are described next referring to FIGS. 5 to 8.

Figure 5:
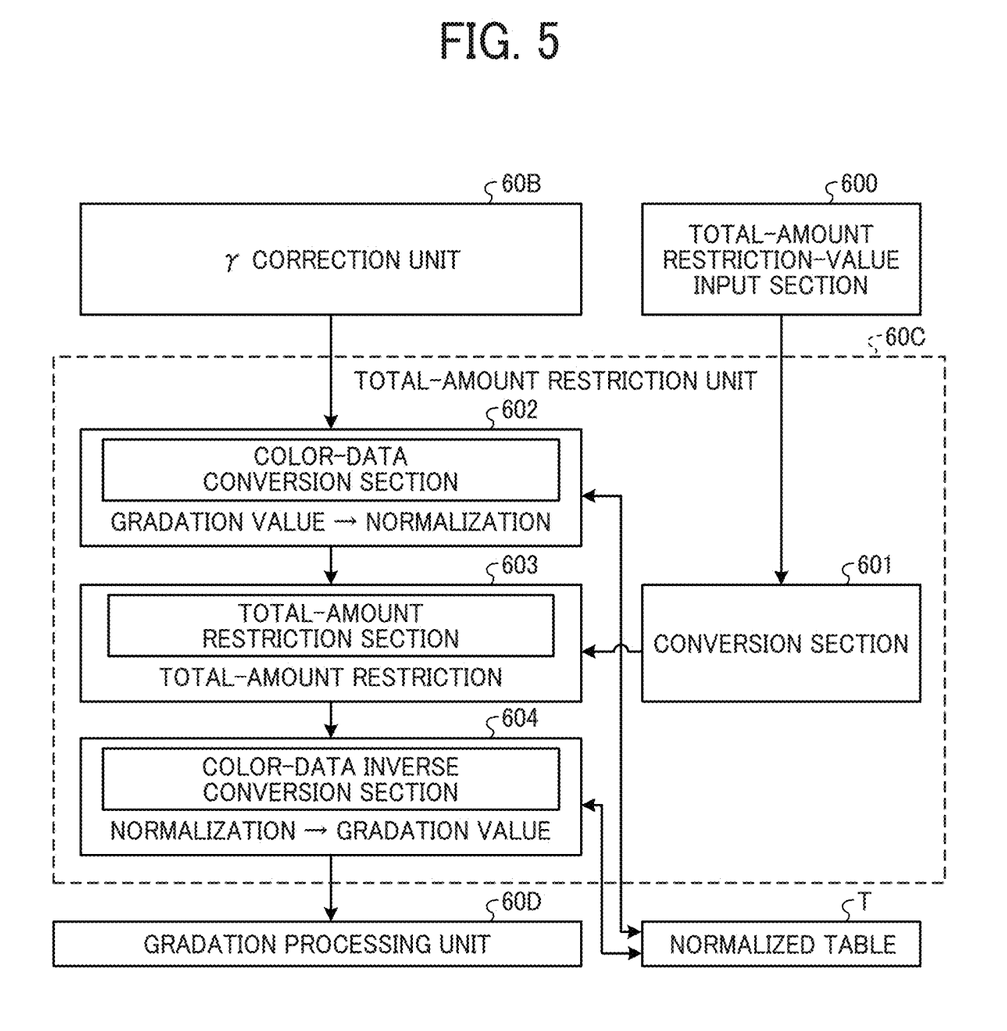
FIG. 5 is a diagram illustrating an example of a specific configuration of a total-amount restriction unit.
Figure 6:
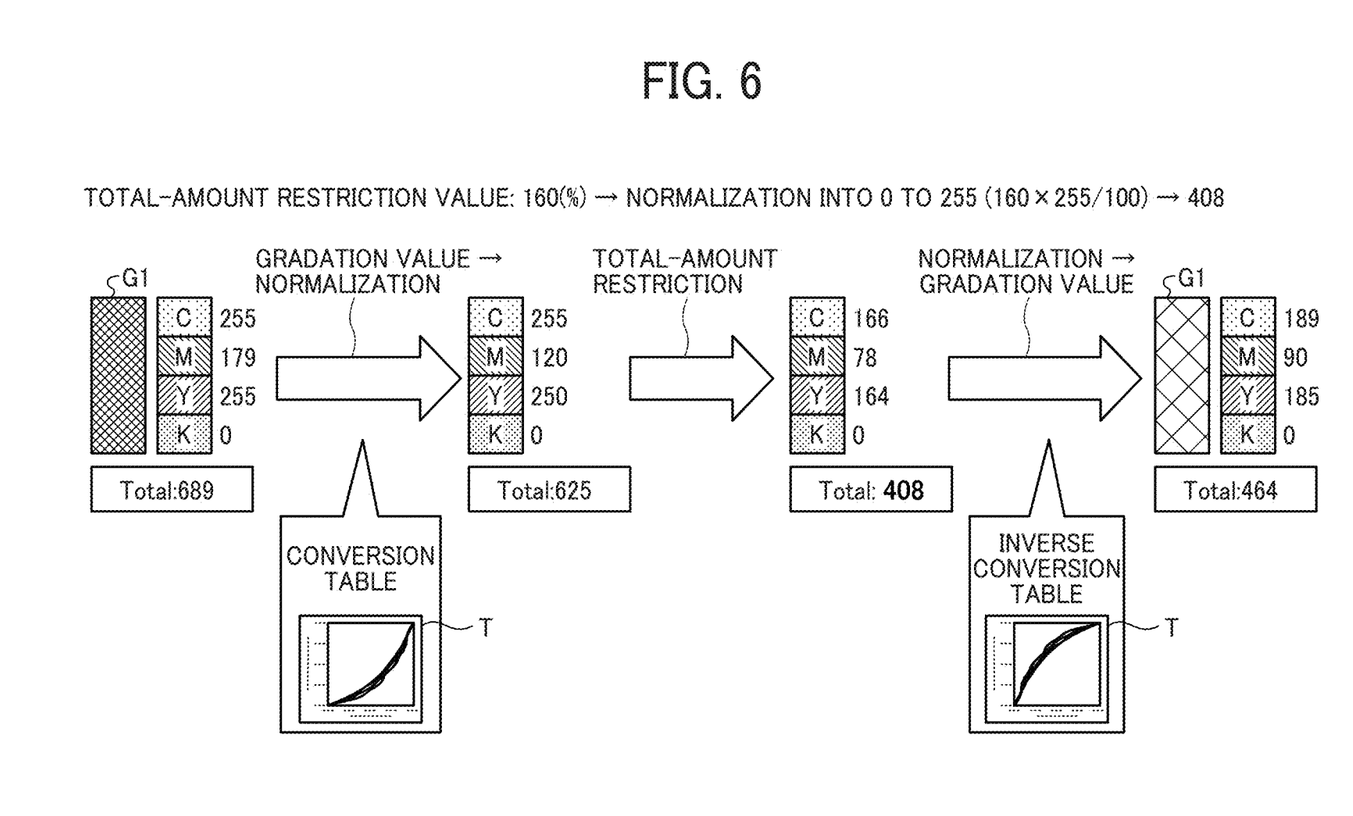
FIG. 6 is a diagram illustrating example processing performed by the total-amount restriction unit.

FIG. 5 is a diagram illustrating an example of a specific configuration of the total-amount restriction unit 60C. FIG. 6 is a diagram illustrating the processing performed by the total-amount restriction unit 60C.

As illustrated in FIG. 5, the total-amount restriction unit 60C includes a conversion section 601, a color-data conversion section 602, a total-amount restriction section 603, and a color-data inverse conversion section 604. In this case, the color-data conversion section 602 is an example of a "first color conversion section". The color-data inverse conversion section 604 is an example of a "second color conversion section".

The conversion section 601 converts the total amount of color materials into the total amount of gradation values based on a total-amount restriction value (%) input to the total-amount restriction-value input section 600. The conversion can be performed by, for example, calculation of α(%)×maximum gradation value/100. As illustrated in FIG. 6, for example, when a total-amount restriction value a is set to 160(%), the calculation in a case where the maximum gradation value is "255" results in 160(%)×255/100=408. The conversion section 601 converts the total amount of "X" of color materials into the total amount of "408" of gradation values based on the total-amount restriction value of "α(%)" by such a calculation method.

The color-data conversion section 602 converts the gradation value of the color data of each color with the γ correction performed by the γ correction unit 60B using a conversion table in which the color material amount is normalized with the gradation value. The conversion table is stored in the memory.

For example, as illustrated in FIG. 6, when gradation values of color data G1 are a C value of "255", an M value of "179", a Y value of "255", and a K value of "0", the color-data conversion section 602 converts the gradation values of the respective colors into color material amounts (normalized values) corresponding to the gradation values with reference to the conversion table of the corresponding colors. In this example, the gradation values are converted into color material amounts of a C value of "255", an M value of "120", a Y value of "250", and a K value of "0" associated with the gradation values in the conversion table.

The total-amount restriction section 603 corrects the values of the respective color data of CMYK converted by the color-data conversion section 602 (the color material amounts after the normalization) to meet the total amount of the gradation values converted by the conversion section 601.

For example, as illustrated in FIG. 6, the total-amount restriction section 603 reduces the C value of "255", the M value of "120", and the Y value of "250" after the conversion such that the total amount of the C value, the M value, and the Y value satisfies the total-amount restriction value of "408" and such that the rate of the each value of CMY is maintained. In this example, subtraction is performed with the same rate to obtain a C value of "166" from "255", an M value of "78" from "120", and a Y value of "164" from "250". The sum of these values is 166+78+164=408, that is, the total amount of the gradation values converted by the conversion section 601.

The color-data inverse conversion section 604 converts the respective values of CMY after the total-amount restriction into gradation values by inverse conversion with the conversion table used by the color-data conversion section 602, that is, conversion with an inverse conversion table.

For example, as illustrated in FIG. 6, the C value of "166", the M value of "78", the Y value of "164", and the K value of "0" are converted into a C value of "189", an M value of "90", a Y value of "185", and a K value of "0" by the inverse conversion. The total of the gradation values becomes "464" that decreases from the initial total value of "689", which is the result of the restriction processing.

By these processing, the proportion of the color material amount of each color before the normalization, that is, by the total-amount restriction without the normalization of the related art, is maintained even after the normalization, that is, by the total-amount restriction according to the present embodiment.

After the color-data inverse conversion section 604 performs the inverse conversion, the print data of the values is output to the gradation processing unit 60D.

Conversion using the conversion table is described with reference to FIGS. 7 and 8.

Figure 7:
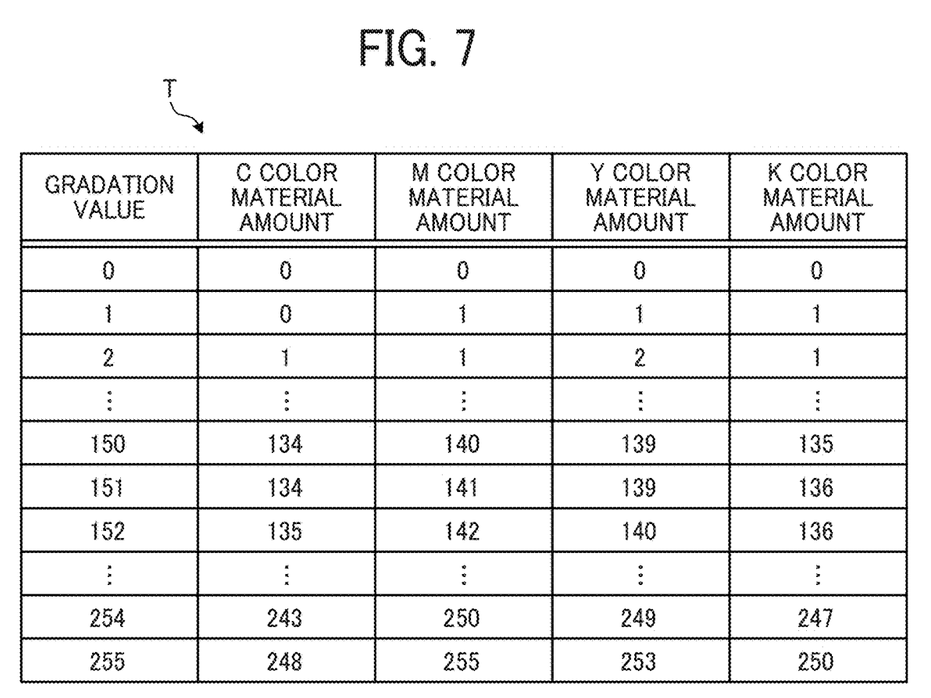
FIG. 7 is a table presenting an example of a conversion table indicating the correspondence relationship between the gradation values of color data and the values of color material amounts normalized in accordance with the maximum value of the gradation values of the color data.

FIG. 7 is a table presenting an example of a conversion table indicating the correspondence relationship between the gradation values of color data and the values of color material amounts normalized in accordance with the maximum value of the gradation values of the color data. Since the maximum values of the color material amounts of the colors of CMYK differ from one another although the maximum value of the gradation values is the same, the color material amounts are normalized on the color basis of CMYK. In this example, for the gradation value of 255, the C color material amount has a maximum value of 248, the M color material amount has a maximum value of 255, the Y color material amount has a maximum value of 253, and the K color material amount has a maximum value of 250, and the normalization is performed based on the maximum values. Accordingly, in the conversion table, the color material amounts of each color are normalized with the rate of the gradation values of the color.

Figure 8:
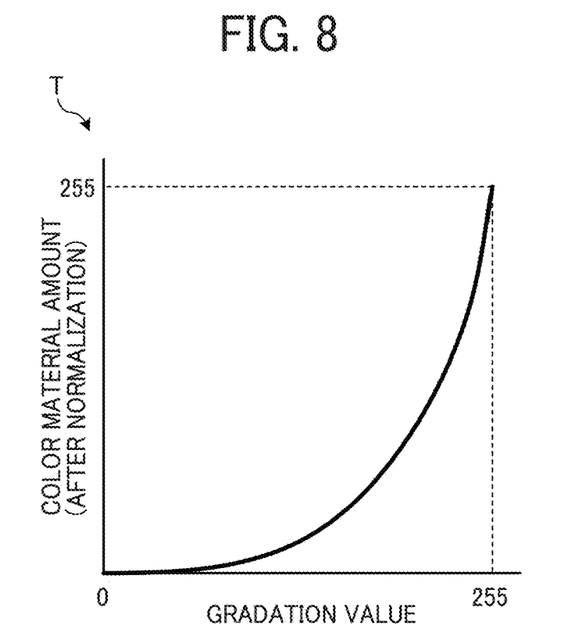
FIG. 8 is a graph presenting an example of the relationship between the gradation value and the color material amount after normalization.

FIG. 8 is a graph presenting the relationship between the gradation value and the color material amount after the normalization. For example, the relationship of the M color material in which the color material amount is normalized to the maximum value of 255 is presented in the graph. The other color materials including the C color material, the Y color material, and the K color material have curves similar to the curve of the M color material although the maximum values of the color material amounts thereof differ from one another.

Flow of Total-Amount Restriction Processing

Figure 9:
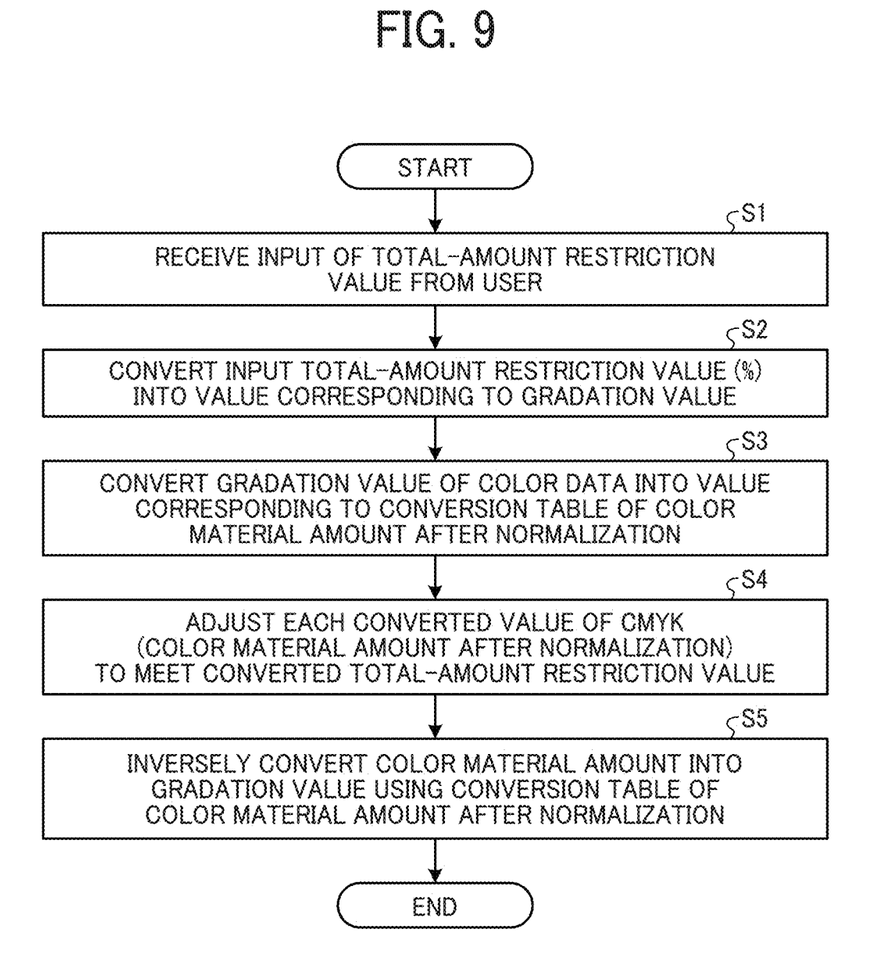
FIG. 9 is a flowchart presenting an example of total-amount restriction processing.

FIG. 9 is a flowchart presenting an example of the total-amount restriction processing. First, the CPU receives a total-amount restriction value set by the user on the setting screen, from the total-amount restriction-value input section 600 (S1).

Then, the CPU (the total-amount restriction unit 60C) converts the total-amount restriction value (%) input to the total-amount restriction-value input section 600 into a value corresponding to a gradation value, using the conversion section 601 (S2).

Then, the CPU converts a gradation value of color data with the γ correction performed by the γ correction unit 60B, into a value corresponding to a color material amount after the normalization, using the color-data conversion section 602 (S3).

Then, the CPU adjusts each value of CMYK (the color material amount after the normalization) converted by the color-data conversion section 602 to meet the total-amount restriction value converted by the conversion section 601, using the total-amount restriction section 603 (S4).

Then, the CPU inversely converts the color material amount into a gradation value with the conversion table T of the color material amount after the normalization, and outputs the gradation value to the gradation processing unit 60D (S5), using the color-data inverse conversion section 604. The processing after the output to the gradation processing unit 60D has been described above. Further description will be redundant, and the description is omitted.

With the above-described method, print data with the total-amount restriction performed on each color material is transmitted to the image forming apparatus 12. The image forming apparatus 12 forms an image based on the color data after the total-amount restriction.

In the present embodiment, the color materials of the four colors of CMYK have been described as an example; however, the color materials are not limited thereto. The number and color of the color materials may be appropriately adjusted in accordance with the configuration of the image forming apparatus.

In one example, a UI unit 64 receives an input of the total-amount restriction value through the UI 10J of the information processing apparatus 10. However, the UI unit 64 may receive and input the total-amount restriction value received through a UI unit of the host computer 16.

The functions of the information processing apparatus 10 may be implemented by software, may be implemented by dedicated hardware such as an application specific integrated circuit (ASIC), or may be implemented by a combination of software and hardware such as an ASIC.

As described above, in the present embodiment, the total-amount restriction processing is performed by converting each color material amount into a value normalized in accordance with the maximum value of gradation values of corresponding color data instead of an actual amount of picoliters (pl) of the color material amount. Thus, the processing of performing the total-amount restriction is simplified, and the technique of the total-amount restriction is easily applied.

Moreover, a conversion table does not have to be provided for each image forming apparatus, and as long as a table for normalization is provided, the total-amount restriction processing can be easily performed by each image forming apparatus.

Furthermore, in the processing of the present embodiment, since the proportion of the color material amount of each color is maintained, the total-amount restriction can be performed without a decrease in precision.

Second Embodiment

While the total-amount restriction processing for color data is performed by the information processing apparatus 10 in the first embodiment, the total-amount restriction processing may be performed by the image forming apparatus 12. A configuration in which an image forming apparatus also has the functions of the information processing apparatus 10 is described as a second embodiment.

Figure 10:
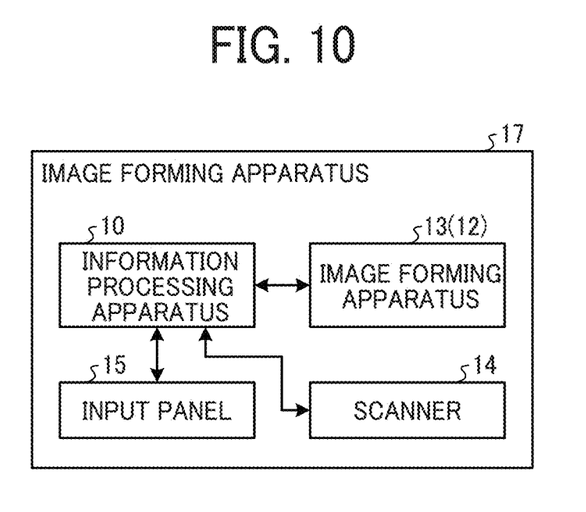
FIG. 10 is a diagram illustrating an example of a configuration of an image forming apparatus according to a second embodiment.

FIG. 10 is a diagram illustrating an example of a configuration of an image forming system 17 according to the second embodiment. The image forming system 17 illustrated in FIG. 10 includes an information processing apparatus 10, an image forming apparatus 13, an input panel 15, and a scanner 14.

In this case, the image forming apparatus 13 corresponds to the image forming apparatus 12 according to the first embodiment. The functions of the information processing apparatus 10 may be implemented by software, may be implemented by dedicated hardware such as an ASIC, or may be implemented by a combination of software and hardware such as an ASIC. The functions of the information processing apparatus 10 are similar to those described in the first embodiment, and hence the description is omitted here.

The input panel 15 corresponds to the UI unit 64 (see FIG. 4) of the information processing apparatus 10, and receives various operations and displays various screens. The user performs setting of the total-amount restriction or the like using the input panel 15 to input the total-amount restriction value (%) to the total-amount restriction-value input section 600.

The scanner 14 is a reader that receives an input of image data. The scanner 14 may be included in or excluded from the configuration.

In one example, the image forming system 17 may be applied to a multifunction peripheral (MFP). The MFP is a multifunction peripheral having at least two functions selected from a copy function, a print function, a scan function, and a facsimile function.

In another example, the image forming system 17 may be applied to an inkjet printer that forms an image by an inkjet method.

The program to be executed by the information processing apparatus 10 according to each of the first and second embodiments may be stored in any computer-readable recording medium, such as a compact disc-read only memory (CD-ROM), a flexible disk (FD), a compact disc-recordable (CD-R), a digital versatile disk (DVD), or the like, in a file format installable or executable by the computer, for distribution.

The program to be executed by the information processing apparatus 10 according to each of the first and second embodiments may be stored in a computer connected to a network such as the Internet and may be provided by being downloaded via the network, for distribution. In one example, the program to be executed by the image forming apparatus according to the embodiment may be provided or distributed via a network such as the Internet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
   circuitry configured to
      convert a total-amount restriction value that is input into a value corresponding to a total gradation value,
      for each of colors of color materials included in an image forming apparatus, normalize a gradation value of color information into a value of a color material amount using a gradation value of the color of the color information by using a conversion table indicating a correspondence between gradation values and color material amounts of the each of the colors,
   perform total-amount restriction on the normalized and converted value of the color material amount of the each of the colors based on the total gradation value, and
   perform an inverse normalization on the respective restricted values of the color material amount of the each of the colors, after the total-amount restriction, by using an inverse conversion table corresponding to the conversion table.

2. The information processing apparatus according to claim 1, wherein, in the conversion table, the color material amounts of the each of the colors are normalized with a rate of the gradation values of the each of the colors.

3. The information processing apparatus according to claim 1, wherein the circuitry is further configured to receive an input of the total-amount restriction value.

4. The information processing apparatus according to claim 1, wherein the circuitry is configured to maintain a proportion of the color material amount of the each of the colors before the normalization even after the normalization.

5. The information processing apparatus according to claim 1,
   wherein the circuitry is configured to
      convert color information on data for printing into color information on the color materials included in the image forming apparatus, and
      perform the total-amount restriction.

6. An image forming system comprising:
   the information processing apparatus according to claim 1; and the image forming apparatus configured to form an image based on color information after the total-amount restriction in the information processing apparatus.

7. The information processing apparatus according to claim 1, wherein the circuitry is further configured to perform the total-amount restriction by reducing the color material amount of each of the colors such that a total color material amount of all of the colors is less than the total gradation value and a proportion of the color material amount of each of the colors is maintained.

8. A method of controlling total-amount restriction of color materials, the method comprising:
    converting a total-amount restriction value that is input into a value corresponding to a total gradation value;
    for each of colors of color materials included in an image forming apparatus, normalizing a gradation value of color information into a value of a color material amount using a gradation value of the color of the color information by using a conversion table indicating a correspondence between gradation values and color material amounts of each of the colors;
    performing total-amount restriction on the normalized and converted value of the color material amount of the each of the colors based on the total gradation value; and
    performing an inverse normalization on the respective restricted values of the color material amount of the each of the colors, after the total-amount restriction, by using an inverse conversion table corresponding to the conversion table.

9. The method according to claim 8, wherein the performing the total-amount restriction includes reducing the color material amount of each of the colors such that a total color material amount of all of the colors is less than the total gradation value and a proportion of the color material amount of each of the colors is maintained.

10. A non-transitory recording medium storing instructions which, when executed by one or more processors, causes the processors to perform a method of controlling total-amount restriction of color materials, the method comprising:
    Converting an input total-amount restriction value into a value corresponding to a total gradation value;
    for each of colors of color materials included in an image forming apparatus, normalizing a gradation value of color information into a value of a color material amount using a gradation value of the color of the color information by using a conversion table indicating a correspondence between gradation values and color material amounts of each of the colors;
    performing total-amount restriction on the normalized and converted value of the color material amount of the each of the colors based on the total gradation value; and
    performing an inverse normalization on the respective value of the color material amount of the each of the colors after the total-amount restriction, by using an inverse conversion table corresponding got the conversion table.

11. The non-transitory recording medium according to claim 10, wherein the performing the total-amount restriction includes reducing the color material amount of each of the colors such that a total color material amount of all of the colors is less than the total gradation value and a proportion of the color material amount of each of the colors is maintained.

* * * * *